April 10, 1962

C. E. SLOOP 3,029,401

CURRENT TRANSFORMER CABINET ASSEMBLY
AND METHOD OF WIRING THE SAME

Filed Aug. 2, 1956

INVENTOR.
CLIFFORD E. SLOOP
BY
ATTORNEY

United States Patent Office 3,029,401
Patented Apr. 10, 1962

3,029,401
CURRENT TRANSFORMER CABINET ASSEMBLY AND METHOD OF WIRING THE SAME
Clifford E. Sloop, 2230 10th St., Columbus, Ga.
Filed Aug. 2, 1956, Ser. No. 601,762
7 Claims. (Cl. 336—92)

This invention relates to electrical current transformer cabinet assemblies and a method of wiring the same, and is particularly concerned with heavy duty, multi-phase transformer cabinet assemblies and wiring arrangements used in metering electrical services.

In heavy duty multi-phase window type transformer cabinet assemblies where the conductors are of large cross-section, considerable cable capacity is required since the minimum radius to which the cable may be bent is necessarily large. Since it is desired that the cables enter and leave the transformer cabinet in parallel relation, it has heretofore been customary to bend each wire within the casing from its entrance line outwardly at substantially a quarter turn and thereafter to rebend the cable in a reverse quarter turn to return it to a line parallel with line of entry but leading to one of the plural window type transformers arranged in side-by-side relation in the cabinet. Similar reverse bends are required on the other side of the transformers to return the cables for parallel relation in leaving the cabinet.

The multiwire cables of heavy duty power supplies do not lend themselves readily to such bending, the permissive radius for each bend from the entrance to a transformer is large as is the return bend on the same radius to the outlet. Furthermore, since each pair of bends is sinusoidal, considerable linear length of cable as well as cabinet depth to house the same is required. Obviously a cabinet to accommodate such cable arrangements is bulky, expensive to manufacture, requires much wall space and it is difficult to arrange the cables satisfactorily therein.

It is therefore among the objects of the present invention to provide a novel and improved current transformer arrangement for heavy duty multi-phase metering transformers by which the arrangement is compact, efficient and effective and well designed to be housed within a cabinet which will meet the demands of economic manufacture.

A further object of the invention is to provide a current transformer cabinet which will receive the transformers and the cables therefor with the cables in a helix whereby they will provide a compact structure of minimum dimension.

Another object of the invention is to provide a current transformer arrangement in which a single loop of each cable provides for the mounting of the metering transformer with respect thereto juxtaposed with respect to the transformers of other cables and thus in such manner as to provide for a compact arrangement requiring minimum space.

It is also an object of the present invention to provide a current transformer assembly in which the transformers may be juxtaposed so as to minimize the space required as distinct from the mounting of the transformers in fixed horizontal spaced relation within the cabinet.

Another object of the invention is to provide a current transformer cabinet of the type referred to in which the transformers may be mounted fixedly upon the cabinet structure in parallel relation without requiring separate reverse bends of each cable upon entering and leaving the cabinet.

It is a further object of the present invention to provide for the cabinet mounting of a current transformer upon heavy duty cable by a single return loop of the cable formed with minimum permissible radius of such bent within the cabinet.

Numerous other objects, features and advantages of the present invention will be apparent from consideration of the following specification taken in conjunction with the accompanying drawing, in which.

While certain aspects of the present inventive concept may be variously carried out as to design and structural details, the invention may be characterized as including a cabinet within which the cables are disposed in arcuate form constituting a single uniform bend of not less than 90 degrees and in which the individual window transformers encircle the selected cables at the bent to provide a compact arrangement capable of being housed within a cabinet of minimum cubic capacity.

Figure 3:
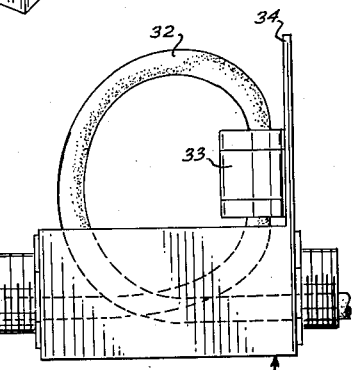
FIG. 3 is a side elevation of the arrangement shown in FIG. 2.

The invention is here presented in three forms. In the first form illustrated in FIG. 1 of the drawing, the cable arrangement shows the cable within the cabinet bent to form a complete return loop of minimum radius with respect to the stiffness of the cable, and the transformers are applied thereto in staggered relation so as to minimize the cubic capacity required for the cabinet to enclose the return loops and the transformers. In that form of the invention shown in FIGS. 2 and 3, the transformers are mounted in side-by-side or parallel relation in the cabinet structure and are fixed thereto. Each phase cable is looped with a return loop passing through its respective window transformer so as to avoid the space required for the bending of the cables from a straight parallel inlet formation out to a transformer and thence return bent to a coaxial outlet position. In that form of the invention shown in FIGS. 4 and 5 a transverse bridge fixedly secures the window transformers and the phase cables are passed therethrough in the single return helix similar to that of the other forms.

While the invention is applicable to a wide variety of sizes of cable, it will be understood that the invention relates generally to 2/0 to 500 MCM and sizes between, through 200/5 ampere or 400/5 ampere, 600 volt window type current transformers in cabinets used in conjunction with metering electrical services. In present day cabinets for transformers of this type, wall space from 396 to 960 square inches has been required. In carrying out the present invention the cabinet has been reduced to as low as 126 square inches of wall space.

This invention provides a new means of containing the aforementioned wires and transformers in a cabinet that is miniature in size compared to those previously used for this accomplishment. A wire requires a considerable space for reverse quarter bends or sweeps, but the same wire will easily close or pull into a relatively small loop, because the flexible wire bends itself to a loop more readily than to 90 degree bends.

Figure 1:
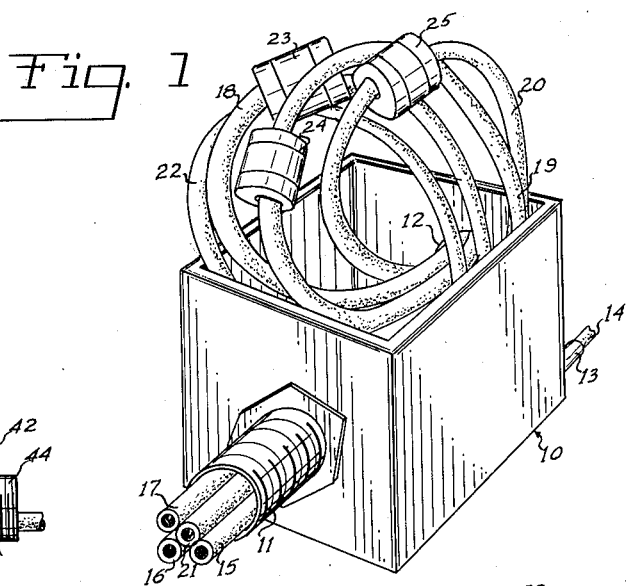
FIG. 1 shows one form of the present current transformer assembly for metering heavy duty polyphase circuits together with the mounting thereof within a cabinet, the cabinet cover being removed.

Referring now more particularly to FIG. 1 of the drawing it will be seen that the cabinet comprises a generally rectangular hollow cabinet 10 of substantial gauge metal, the ends of which are apertured and receive therethrough inlet and outlet conduit coupling members 11 and 12. An additional smaller outlet conduit coupling 13 is provided for the lead out of the cable 14. As here presented the device is provided for heavy duty three phase current suppply, individual window transformers encircle the individual phase cables each transformer being individually mounted on its cables and ground to a separate ground cable. Each transformer is provided with a pair of conductors leading therefrom through the smaller outlet conduit coupling 13. As shown in FIG. 1 each phase cable 15, 16 and 17 enters the box through the inlet conduit coupling 11 and is formed with a single helical return loop 18, 19 and 20, respectively, and leads therefrom through the outlet conduit coupling 12. Similarly the ground cable 21 is also formed with a single helical return loop 22 within the cabinet and passes therefrom in parallel relation with the phase cables. Within the cabinet to be enclosed by a cover (not shown), each phase cable is passed through an encircling window type transformer indicated at 23, 24 and 25, respectively. Suitable conductors arranged in conventional manner connect the transformers with the ground cable and each transformer is provided with a pair of conductors which extend outwardly as a unit cable 14 through the conduit coupling 13 as shown.

It will, of course, be understood by those skilled in the art that the circuit arrangement for the conductors and transformers and phase cables and ground cables are purely conventional and that the invention is not concerned witht a specific type of connection. Since the invention is concerned with the arrangement of the cables, their loops and the location thereon of the window transformers, no specific circuits have been presented.

It is to be noted that, in the arrangement here shown, the transformers of FIG. 1 are arranged on the cables in juxtaposed relation one to another so that as each cable is looped with one complete helical turn the transformers are mounted thereon in angular spaced relation with respect to each loop of cable so as to avoid side by side relationship of the transformers which would increase the required internal capacity of the cabinet. Such an arrangement may be designated as a "jumble" arrangement in that the cables are loose within the cabinet and are freely movable one with respect to another, and the transformers are disposed thereon in spaced relation with respect to each other but without particular designation as to their ultimate location within the cabinet. One feature of this form of the invention is the diagonal disposition of the plural helix in the cabinet so as to minimize the overall dimensions of the cabinet with respect to a given helix radius.

Figure 2:
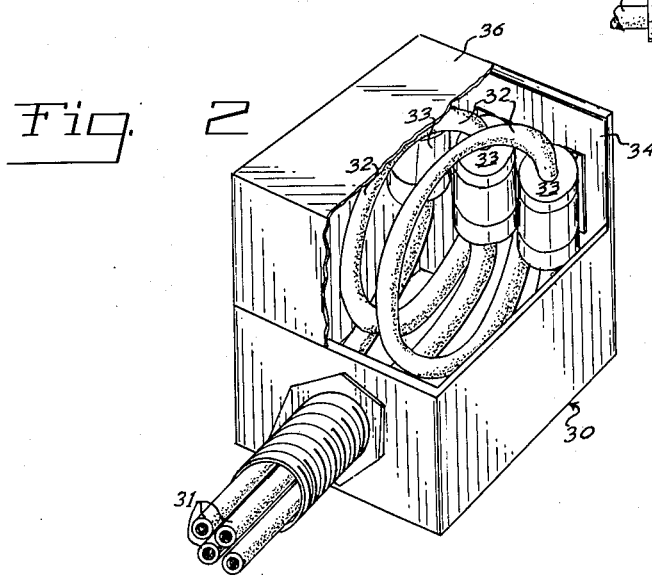
FIG. 2 is a perspective view of another form of the present invention showing the current transformer assembly and the cabinet wiring therefor.

Referring now to FIG. 2 of the drawing, it will be seen that the same type of economy of space may be provided in a cabinet in which the transformers are fixedly mounted in parallel spaced relation within the cabinet. In this form of the invention the cabinet is shown as comprising a rectangular hollow container 30 provided with the same type of conventional conduit receiving fixtures on either side thereof; however, in this form of the inevntion the cables 31 are led in parallel relation and the loops 32 thereof are in parallel relation with the transformers 33 mounted on a panel 34 extending upward from the cabinet base. The transformers are fixed to the upwardly extending panel which may be closed by a cover member 36. In this case it will also be noted that great economy of cubic content of the cabinet is achieved by the use of a complete helical bend of the cable.

It will of course be understood in both instances the radius of the cable loop is the minimum which may be permitted in view of the number of wires in each cable and the diameter of such wires which constitute the limiting factors in determining the minimum arcuate bend permitted for the cable. It will also be understood that in the interest of economy of space, the minimum radius of cable bend is preferable; however, since the present arrangement requires materially less cubic content for the cabinet, the minimum bend may not necessarily be slavishly followed and it will be seen that because of this ample space a great facility in arrangement and connection of the cables and their transformers is insured.

Figure 4:
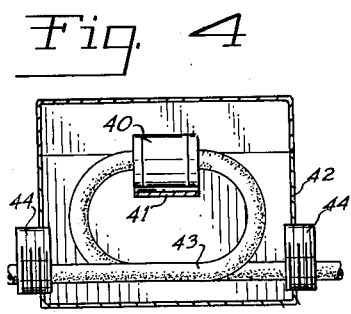
FIG. 4 is a side elevation showing the structure and arrangement of another modified form of the invention.
Figure 5:
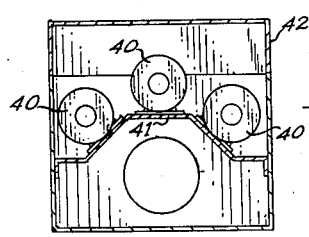
FIG. 5 is a transverse vertical section of that form of the invention shown in FIG. 4.

In that form of the invention shown in FIGS. 4 and 5, the transformers 40 are mounted on a fixed arcuate bridge 41 within the generally rectangular cabinet 42. As seen in FIG. 4, the cables 43 are looped through the secured window transformers entering and leaving through the conventional conduit connectors 44 as shown. In this instance the same economy of cubic content of the required cabinet is achieved.

In practicing the method of the present invention, the cables are inserted through the inlet conduit connection. They are then bent in an arc within the cabinet and in so doing are passed through the window transformers. In that form of the invention shown in FIGS. 2 to 5, the transformers may be in fixed and secured position before the cables are passed therethrough if desired or they may be loosely arranged on the cables for subsequent securement. After passing through the window transformers the cables are further bent to complete the helix and are then passed through the outlet conduit coupling. Thereafter the cables are tensioned by securement of one outer end and application of outer tension on the opposite outer end. Such tension will reduce the helix radius and pull the loops down into the cabinets. Securement of the cover will then retain the cables in their compact closely confined helical arrangement.

In the practice of the invention it will be understood that numerous changes, modifications and the full use of equivalents may be resorted to without departing from the spirit or scope of the invention as defined by the appended claims.

I claim:

1. A current transformer assembly for metering electrical service including a generally rectangular cabinet, cable inlet and outlet fixtures extending into said cabinet, a plurality of cables having parallel straight flights entering and leaving said fixtures and each of said cables including an intermediate sweep within said cabinet of substantially uniform curvature of approximately 360 degrees arc between said flights, and window type transformers encircling said cables on said sweeps on a single pass of said cable through said cabinet, said transformers being arranged at angularly spaced locations on the separate sweeps so as to be juxtaposed.

2. A current transformer assembly for metering electrical service including a generally rectangular cabinet including a hollow base portion and a panel extending upwardly from said base portion, cable inlet and outlet fixtures extending into said base portion, a plurality of cables having parallel straight flights entering and leaving said fixtures and each of said cables including an intermediate helical sweep within said cabinet of substantially uniform curvature of approximately 360 degrees arc between said flights, window type transformers encircling said cables on said sweeps on a single pass of said cable through said cabinet, said transformers being secured on said panel in said cabinet in parallel spaced relation, and a cover means on said cabinet for enclosing said transformers and said sweeps of said cables.

3. A transformer cabinet assembly for metering electrical services including a cabinet, cables entering through one wall of the cabinet and formed with arcuate bends of approximately 360 degrees within said cabinet, and window type current transformers encircling the cables within the cabinet along said bends on a single pass of said cable through said cabinet, said transformers being secured to a wall of the cabinet.

4. A current transformer cabinet assembly for metering electrical services including a cabinet, cables entering through one wall of the cabinet and formed with arcuate bends of approximately 360 degrees within said cabinet, and window type current transformers encircling the cables within the cabinet along the arcs of said bends on a single pass of said cable through said cabinet, said transformers being secured in parallel relation to a wall of the cabinet.

5. A transformer cabinet assembly for metering electrical services including a cabinet, cables entering through one wall of the cabinet and formed with bends of approximately 360 degrees arc within said cabinet, and window type current transformers encircling the cables within the cabinet at points along the arcs of said bends on a single pass of said cable through said cabinet, said cables leaving said cabinet through a wall opposite and parallel to the wall through which they entered, the entering and leaving flights of said cables being straight with the cables in close parallelism.

6. A transformer cabinet assembly for metering electrical services including a cabinet, cables entering through one wall of the cabinet and formed with bends of approximately 360 degrees arc within said cabinet, and window type current transformers encircling the cables within the cabinet at points along the arcs of said bends on a single pass of said cable through said cabinet, said cables leaving said cabinet through a wall opposite and parallel to the wall through which they entered, the entering and leaving flights of said cables being straight with the cables in close parallelism, and the transformers being arranged on the bends at varying angular relations.

7. A current transformer arrangement including a generally rectangular cabinet, opposed cable inlet and outlet fixtures extending through opposed walls of said cabinet, a plurality of cables having parallel flights entering and leaving said fixtures and each of said cables including an intermediate loop of approximately 360 degrees in said cabinet between said flights together with a window type transformer encircling each of said loops on a single pass of said cable through said cabinet, and a transverse bridge mounted inside said cabinet, said transformers being secured to said bridge in said cabinet in parallel spaced relation.

References Cited in the file of this patent

UNITED STATES PATENTS

| | | |
|---|---|---|
| 900,382 | Joynes | Oct. 6, 1908 |
| 1,847,924 | Calderwood | Mar. 1, 1932 |
| 2,394,648 | Woolfolk | Feb. 12, 1946 |
| 2,431,189 | Moreton et al. | Nov. 18, 1947 |
| 2,507,803 | Miller | May 16, 1950 |
| 2,654,142 | Horelick | Oct. 6, 1953 |
| 2,756,399 | August et al. | July 24, 1956 |

FOREIGN PATENTS

| | | |
|---|---|---|
| 507,023 | Italy | Dec. 28, 1954 |